United States Patent
Nishimura et al.

(10) Patent No.: US 7,336,218 B2
(45) Date of Patent: Feb. 26, 2008

(54) RADAR SYSTEM WITH PEAK FREQUENCY ANALYSIS AND WINDOW FUNCTIONS

(75) Inventors: Tetsu Nishimura, Toyonaka (JP); Toru Ishii, Hirakata (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 11/588,242

(22) Filed: Oct. 27, 2006

(65) Prior Publication Data
US 2007/0040728 A1 Feb. 22, 2007

Related U.S. Application Data

(63) Continuation of application No. PCT/JP2005/007976, filed on Apr. 27, 2005.

(30) Foreign Application Priority Data
May 11, 2004 (JP) ............................ 2004-141504

(51) Int. Cl.
*G01S 13/526* (2006.01)
*G01S 13/93* (2006.01)

(52) U.S. Cl. .................... 342/70; 342/99; 342/101; 342/111; 342/116; 342/128; 342/159; 342/162; 342/192; 342/196

(58) Field of Classification Search ............ 342/70–72, 342/89–90, 98–101, 107–112, 115–116, 128–129, 342/159–162, 192, 195, 196
See application file for complete search history.

(56) References Cited

U.S. PATENT DOCUMENTS 5,508,706 A * 4/1996 Tsou et al. .................. 342/192
6,127,965 A * 10/2000 McDade et al. ............ 342/159
6,292,129 B1 * 9/2001 Matsugatani et al. ......... 342/70
6,339,395 B1 * 1/2002 Hazumi et al. ............. 342/196
6,469,662 B2 * 10/2002 Tullsson ..................... 342/195
6,657,582 B2 * 12/2003 Seki et al. .................... 342/70
6,795,012 B2 * 9/2004 Nakanishi et al. ............ 342/70
2006/0238405 A1 * 10/2006 Wakayama et al. .......... 342/79
2007/0040728 A1 * 2/2007 Nishimura et al. ........... 342/70

FOREIGN PATENT DOCUMENTS

JP 5-249234 9/1993
JP 11-271432 10/1999

OTHER PUBLICATIONS

Written Opinion dated Jun. 14, 2005 (English translation).
International Search Report dated Jun. 15, 2005.

* cited by examiner

*Primary Examiner*—John B Sotomayor
(74) *Attorney, Agent, or Firm*—Dickstein Shapiro LLP

(57) ABSTRACT

A radar system in which a beat signal is generated by transmitting a transmission signal that is subjected to frequency modulation into a triangular wave and receiving a reflection signal from a target, the beat signal is sampled, and a window function is applied to yield a discrete frequency spectrum. When the window function is applied, a first window function having an amplitude that is gently attenuated from the center of the sampling period toward both sides thereof is applied in a lower frequency band in the frequency spectrum (at close range), and a second window function having an amplitude that is sharply attenuated from the center of the sampling period toward both sides thereof is applied in a higher frequency band in the frequency spectrum (at far range).

5 Claims, 17 Drawing Sheets

(A)

(B)

(C)

(D)

(A)

(B)

(A)

(B)

US 7,336,218 B2

RADAR SYSTEM WITH PEAK FREQUENCY ANALYSIS AND WINDOW FUNCTIONS

CROSS REFERENCE TO RELATED APPLICATIONS

The present application is a continuation of International Application No. PCT/JP2005/007976, filed Apr. 27, 2005, which claims priority to Japanese Patent Application No. JP2004-141504, filed May 11, 2004, the entire contents of each of these applications being incorporated herein by reference in their entirety.

FIELD OF THE INVENTION

The present invention relates to systems detecting targets by using radio waves. More particularly, the present invention relates to a radar system detecting a target on the basis of the frequency spectrum of a beat signal yielded from a transmission signal and a reception signal.

BACKGROUND OF THE INVENTION

FM-CW (frequency modulated continuous wave) radar systems using millimeter radio waves have been developed as in-vehicle radar systems. In the FM-CW radar systems, a radio wave is subjected to frequency modulation within a predetermined frequency range around a predetermined frequency and a beat signal is yielded from a transmission signal and a reception signal. The beat frequency of the beat signal during a frequency-rising modulation period during which the frequency of the transmission signal is rising and the beat frequency thereof during a frequency-falling modulation period during which the frequency of the transmission signal is falling are identified to calculate a distance from the antenna to a target and a relative speed of the target with respect to the antenna.

The frequency modulation is performed at a predetermined angle of inclination during the frequency-rising modulation period and the frequency-falling modulation period to modulate a transmission wave into a triangular modulation wave. Common FM-CW radar systems use voltage controlled oscillators (VCOs) for the modulation of the transmission wave. However, the oscillation characteristics of the VCOs are liable to vary due to the temperature characteristics or due to aging to cause distortion in the modulation waveform. If any distortion occurs in the modulation wave, the angle of inclination of the triangular modulation wave during the frequency-rising modulation period becomes different from that of the triangular modulation wave during the frequency-falling modulation period. In other words, the triangular modulation wave becomes non-linear.

The triangular modulation wave with any distortion does not provide a sharp peak in the frequency spectrum even if discrete Fourier transform is performed in a manner described below, thus making the detection of the target difficult or causing a significant error.

Conventionally, as shown in FIG. 18, beat signals are sampled, a window function is applied to the sampled data and the discrete Fourier transform is performed to yield a frequency spectrum (analyze the frequency), and any peak included in the frequency spectrum, caused by a reflection signal from the target, is extracted (hereinafter simply referred to "peak extraction").

FIG. 16(A) shows a triangular modulation wave without distortion. FIG. 16(B) shows the frequency variation of the beat signal during the frequency-rising modulation periods and the frequency-falling modulation periods in the example shown in FIG. 16(A). FIG. 16(C) shows a triangular modulation wave with distortion. FIG. 16(D) shows the frequency variation of the beat signal during the frequency-rising modulation periods and the frequency-falling modulation periods in the example shown in FIG. 16(C).

When the triangular modulation wave is distorted in the above manner, the frequency of the beat signal during the frequency-rising modulation period becomes different from that of the beat signal during the frequency-falling modulation period.

FIG. 17 is a graph showing the respective frequency spectra when the modulation wave is distorted and when the modulation wave is not distorted. Referring to FIG. 17, "a" shows a result when the modulation wave is not distorted as in the example shown in FIG. 16(A), and "b" shows a result when the modulation wave is distorted as in the example shown in FIG. 16(C). Without any modulation distortion, a peak having a very narrow bandwidth occurs because the frequency of the beat signal is not varied during the sampling period. In contrast, with any modulation distortion, a peak having a wider bandwidth occurs because the frequency of the beat signal is continuously varied during the sampling period. As a result, there are problems in that it becomes difficult to detect a target and that a distance cannot be detected with higher accuracy.

Accordingly, methods of applying a control voltage having an inverse waveform (inverse function) with respect to the voltage-frequency characteristics of a VCO to the VCO to make the time-frequency characteristics linear are disclosed in Patent Documents 1 to 3. In addition, a method of correcting the nonlinearity of a VCO in sampling of a beat signal is disclosed in Patent Document 4. Furthermore, a method of applying a frequency control signal corresponding to the temperature characteristics of a VCO to the VCO is disclosed in Patent Document 5.

Patent Document 1: Japanese Unexamined Patent Application Publication No. 7-055924
Patent Document 2: Japanese Unexamined Patent Application Publication No. 7-198833
Patent Document 3: Japanese Unexamined Patent Application Publication No. 8-327728
Patent Document 4: Japanese Unexamined Patent Application Publication No. 7-128439
Patent Document 5: Japanese Unexamined Patent Application Publication No. 10-197625

In the methods disclosed in Patent Documents 1 to 5, a correction bias voltage generated by using a digital-to-analog (DA) converter or a digital signal processor (DSP) is applied to the VCO to generate a highly linear triangular wave. However, since the DA converter or the DSP (an arithmetic processor in the DSP) is required, the system undesirably becomes complicated and increases the cost of the system.

In addition, since it is necessary to calculate compensation values of individual VCOs or to measure the temperature characteristics of individual VCOs to perform the correction, there is a problem in that the measurement, adjustment, and setting works require a large amount of time and effort and increases the manufacturing cost. Furthermore, since a feedback loop is not used in the correction, the correction can involve shifts due to aging. Although the problem due to aging can be resolved if a feedback loop, such as a phase locked loop (PLL), is used in the correction, the circuit configuration becomes complicated and greatly increases the manufacturing cost.

SUMMARY OF THE INVENTION

Accordingly, it is an object of the present invention to provide a radar system capable of resolving a problem caused by any distortion in a modulation wave without complicating the system and increasing the cost of the system to easily detect a target with higher accuracy.

(1) A radar system according to an embodiment of the present invention includes means for transmitting a transmission signal subjected to frequency modulation and generating a beat signal including a frequency component corresponding to a difference in frequency between the transmission signal and a reflection signal from a target to which the transmission signal is transmitted; frequency analyzing means for sampling the beat signal and applying a window function to the sampled data to yield a discrete frequency spectrum; means for yielding a peak frequency of a peak appearing in the frequency spectrum due to the reflection signal; and target detecting means for detecting the target on the basis of the peak frequency. The frequency analyzing means selectively applies a plurality of window functions (multiple types of window functions) having amplitudes (weights) that are differently attenuated from the center of the sampling period toward both sides. The window function having an amplitude that is gently attenuated from the center of the sampling period toward both sides is applied to a lower frequency band in the frequency spectrum to yield the frequency spectrum, and the window function having an amplitude that is sharply attenuated from the center of the sampling period toward both sides is applied to a higher frequency band in the frequency spectrum to yield the frequency spectrum.

(2) A radar system according to another embodiment of the present invention includes means for transmitting a transmission signal subjected to frequency modulation and generating a beat signal including a frequency component corresponding to a difference in frequency between the transmission signal and a reflection signal from a target to which the transmission signal is transmitted; frequency analyzing means for sampling the beat signal and applying a window function to the sampled data to yield a discrete frequency spectrum; means for yielding a peak frequency of a peak appearing in the frequency spectrum due to the reflection signal; and target detecting means for detecting the target on the basis of the peak frequency. The frequency analyzing means selectively applies a plurality of window functions (multiple types of window functions) having amplitudes (weights) that are differently attenuated from the center of the sampling period toward both sides. The window function having an amplitude that is gently attenuated from the center of the sampling period toward both sides is applied when it is predicted that the peak appears in a lower frequency band in the frequency spectrum yielded by the frequency analysis, and the window function having an amplitude that is sharply attenuated from the center of the sampling period toward both sides is applied when it is predicted that the peak appears in a higher frequency band in the frequency spectrum.

(3) In the radar system described in (2), the detection of the target by the target detecting means is repeated, and the window functions having amplitudes that are differently attenuated from the center of the sampling period toward both sides are selectively applied depending on the distance to the target, calculated in the last detection or a detection previous to the last detection.

(4) An in-vehicle radar system mounted in a vehicle according to another embodiment of the present invention includes means for transmitting a transmission signal subjected to frequency modulation and generating a beat signal including a frequency component corresponding to a difference in frequency between the transmission signal and a reflection signal from a target to which the transmission signal is transmitted; frequency analyzing means for sampling the beat signal and applying a window function to the sampled data to yield a discrete frequency spectrum; means for yielding a peak frequency of a peak appearing in the frequency spectrum due to the reflection signal; and target detecting means for detecting the target on the basis of the peak frequency. The frequency analyzing means selectively applies a plurality of window functions (multiple types of window functions) having amplitudes (weights) that are differently attenuated from the center of the sampling period toward both sides. The window function having an amplitude that is gently attenuated from the center of the sampling period toward both sides is applied while the vehicle is driving at a lower speed, and the window function having an amplitude that is sharply attenuated from the center of the sampling period toward both sides is applied while the vehicle is driving at a higher speed.

(5) An in-vehicle radar system mounted in a vehicle according to another embodiment of the present invention includes means for transmitting a transmission signal subjected to frequency modulation and generating a beat signal including a frequency component corresponding to a difference in frequency between the transmission signal and a reflection signal from a target to which the transmission signal is transmitted; frequency analyzing means for sampling the beat signal and applying a window function to the sampled data to yield a discrete frequency spectrum; means for yielding a peak frequency of a peak appearing in the frequency spectrum due to the reflection signal; and target detecting means for detecting the target on the basis of the peak frequency. The frequency analyzing means selectively applies a plurality of window functions (multiple types of window functions) having amplitudes (weights) that are differently attenuated from the center of the sampling period toward both sides. The radar system has a function of directing a scanning beam at a horizontal angle in the front of the vehicle, and the window function having an amplitude that is gently attenuated from the center of the sampling period toward both sides is applied in ranges having larger scanning angles with respect to the front of the vehicle and the window function having an amplitude that is sharply attenuated from the center of the sampling period toward both sides is applied in a range having a smaller scanning angle with respect to the front of the vehicle.

According to the embodiment of the present invention described in (1), multiple window functions having amplitudes (weights) that are differently attenuated from the center of the sampling period toward both sides are selectively applied as the window function that is applied to sampled data in yield of a discrete frequency spectrum. A window function having a sharper peak in the frequency spectrum due to the reflection signal from the target can be selected to produce the sharp peak in the frequency spectrum. Alternatively, a peak can be selected from the frequency spectra resulting from the application of the multiple window functions to use the sharp peak in the frequency spectrum. Accordingly, the radar system is not greatly affected by any distortion in the modulation waveform, thus achieving easy and accurate detection of the target. Specifically, the window function having an amplitude that is gently attenuated from the center of the sampling period toward both sides is applied in a lower frequency band in the frequency spectrum and the window function having an amplitude that is sharply attenuated from the center of the sampling period toward both sides is applied in a higher frequency band in the frequency spectrum in order to yield the frequency spectrum. Consequently, the sharp peak can be produced over a range from the lower frequency band to the higher frequency band in the frequency spectrum and, therefore, it is possible to realize reliable and accurate detection of the target over a wider range.

According to the embodiment of the present invention described in (2), the window function having an amplitude that is gently attenuated from the center of the sampling period toward both sides is applied when it is predicted that the peak appears in a lower frequency band in the frequency spectrum, and the window function having an amplitude that is sharply attenuated from the center of the sampling period toward both sides is applied when it is predicted that the peak appears in a higher frequency band in the frequency spectrum. Accordingly, a sharp peak can be produced regardless of the frequency in the frequency spectrum at which the peak appears, thus achieving reliable and accurate detection of the target over a wider range.

According to the embodiment of the present invention described in (3), the detection of the target by the target detecting means is repeated, and the window functions having amplitudes that are differently attenuated from the center of the sampling period toward both sides are selectively applied depending on the distance to the target, calculated in the last detection or a detection previous to the last detection. Accordingly, a sharp peak caused by the target can be produced in the frequency spectrum depending on the target to be detected and, therefore, it is possible to reliably track the target even with a signal having a low SN ratio.

According to the embodiment of the present invention described in (4), the window function having an amplitude that is gently attenuated from the center of the sampling period toward both sides is applied while the vehicle is driving at a lower speed, and the window function having an amplitude that is sharply attenuated from the center of the sampling period toward both sides is applied while the vehicle is driving at a higher speed. Accordingly, it is possible to accurately detect a distance to the target that is possibly located at close range with higher accuracy while the vehicle is driving at a lower speed and to reliably detect the target that is possibly located at far range while the vehicle is driving at a higher speed.

According to the embodiment of the present invention described in (5), the window function having an amplitude that is gently attenuated from the center of the sampling period toward both sides is applied in ranges having larger scanning angles with respect to the front of the vehicle and the window function having an amplitude that is sharply attenuated from the center of the sampling period toward both sides is applied in a range having a smaller scanning angle with respect to the front of the vehicle. Accordingly, it is possible to increase the detection accuracy of the target (another vehicle) at far range in the front of the vehicle and to increase the detection accuracy at close range in diagonal directions on the left and right sides of the front of the vehicle.

REFERENCE NUMERALS

1 RF block
2 signal processor block
3 dielectric lens
4 primary radiator
16 scanning unit

DESCRIPTION OF THE INVENTION

Figure 1:
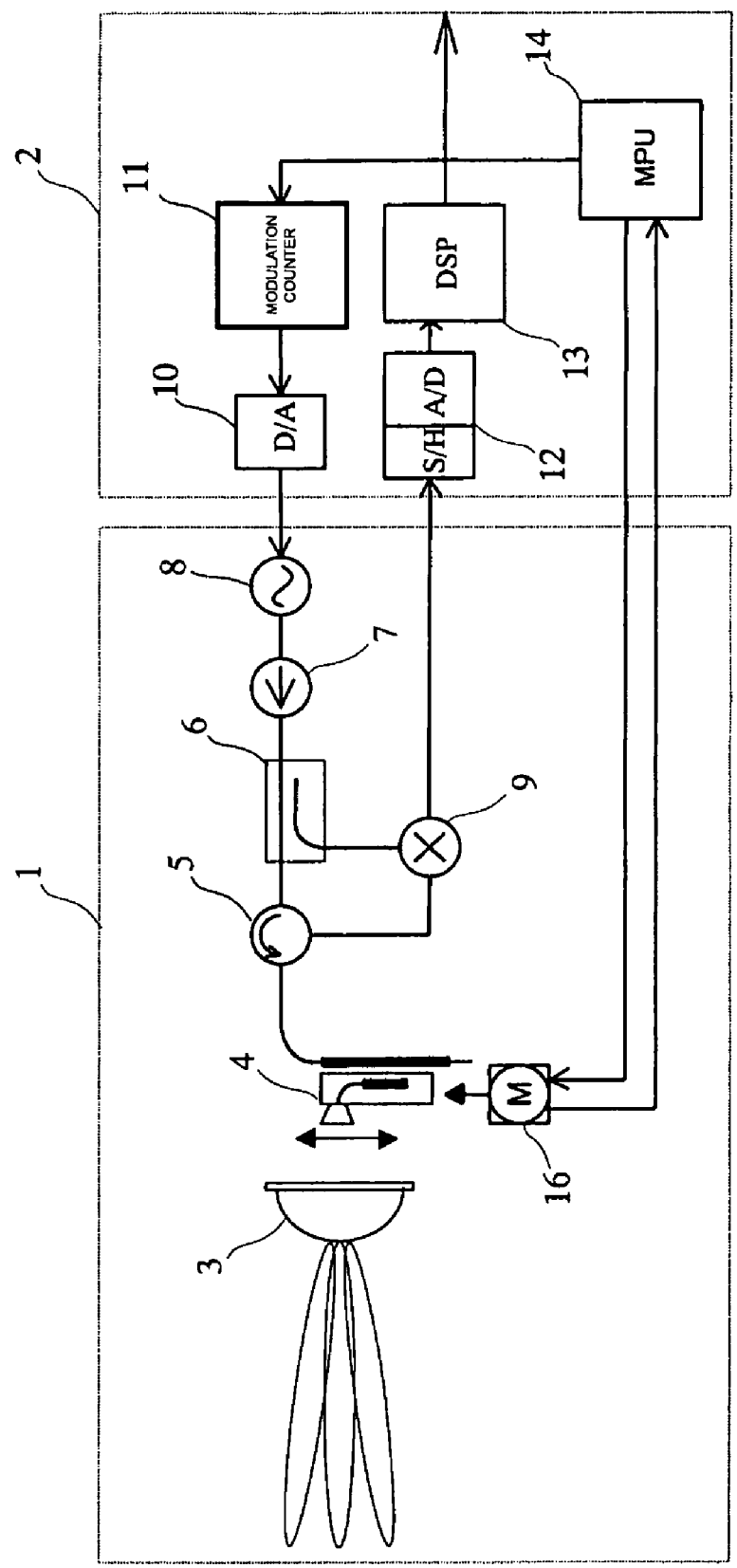
FIG. 1 is a block diagram of a radar system according to a first embodiment.

FIG. 1 is a block diagram showing the structure of a radar system according to an embodiment of the present invention.

Referring to FIG. 1, reference numeral 1 denotes a radio-frequency (RF) block and reference numeral 2 denotes a signal processor block. The RF block 1 transmits and receives a radio wave for measurement with the radar system and supplies a beat signal yielded from the transmission wave and the reception wave to the signal processor block 2. A modulation counter 11 in the signal processor block 2 performs counting and supplies the counted value to a digital-to-analog (DA) converter 10 in order to cause the DA converter 10 to generate a triangular-wave signal. The DA converter 10 converts the supplied value into an analog voltage signal and supplies the analog voltage signal to a voltage controlled oscillator (VCO) 8 in the RF block 1 to perform frequency modulation to the transmission wave. An oscillation signal from the VCO 8 is supplied to a primary radiator 4 through an isolator 7, a coupler 6, and a circulator 5. The primary radiator 4 is arranged on the focal plane of a dielectric lens 3 or near the focal plane thereof. The dielectric lens 3 transmits a millimeter-wave signal radiated from the primary radiator 4 as a sharp beam. When a reflection signal from a target (such as a vehicle) is incident on the primary radiator 4 through the dielectric lens 3, the reception signal is supplied to a mixer 9 through the circulator 5. The mixer 9 receives the reception signal and a local signal, which is part of the transmission signal from the coupler 6. The mixer 9, then, supplies a beat signal having a frequency that is equal to a difference in frequency between the reception signal and the local signal to an analog-to-digital (AD) converter 12 including a sample-and-hold circuit in the signal processor block 2 as an intermediate-frequency signal. The AD converter 12 converts the beat signal into digital data. A digital signal processor (DSP) 13 performs fast Fourier transform (FFT) to the data sequence supplied from the AD converter 12 to calculate a relative distance to the target and a relative speed of the target, in a manner described below.

Reference numeral 16 in the RF block 1 denotes a scanning unit that horizontally moves the primary radiator 4 on the focal plane of the dielectric lens 3 or on a plane parallel to the focal plane thereof. A 0 dB-coupler is provided between the movable portion where the primary radiator 4 is disposed and the fixed portion. Reference letter M denotes a drive motor that performs beam scanning, for example, within a range from −10° to +10° at a cycle of 100 ms.

A microprocessor unit 14 in the signal processor block 2 controls the modulation counter 11 and the scanning unit 16. The microprocessor unit 14 directs the beam at the scanning unit 16 at a predetermined angle and sets a counting cycle such that the VCO 8 is modulated by the use of the triangular wave corresponding to one crest composed of the frequency-rising modulation period and the frequency-falling modulation period while the scanning unit 16 remains stationary. The microprocessor unit 14 extracts the peak appearing in the frequency spectrum during the frequency-rising modulation period and the peak appearing in the frequency spectrum during the frequency-falling modulation period, calculated by the DSP 13. This extraction of the pair of peaks is called pairing.

Figure 2:
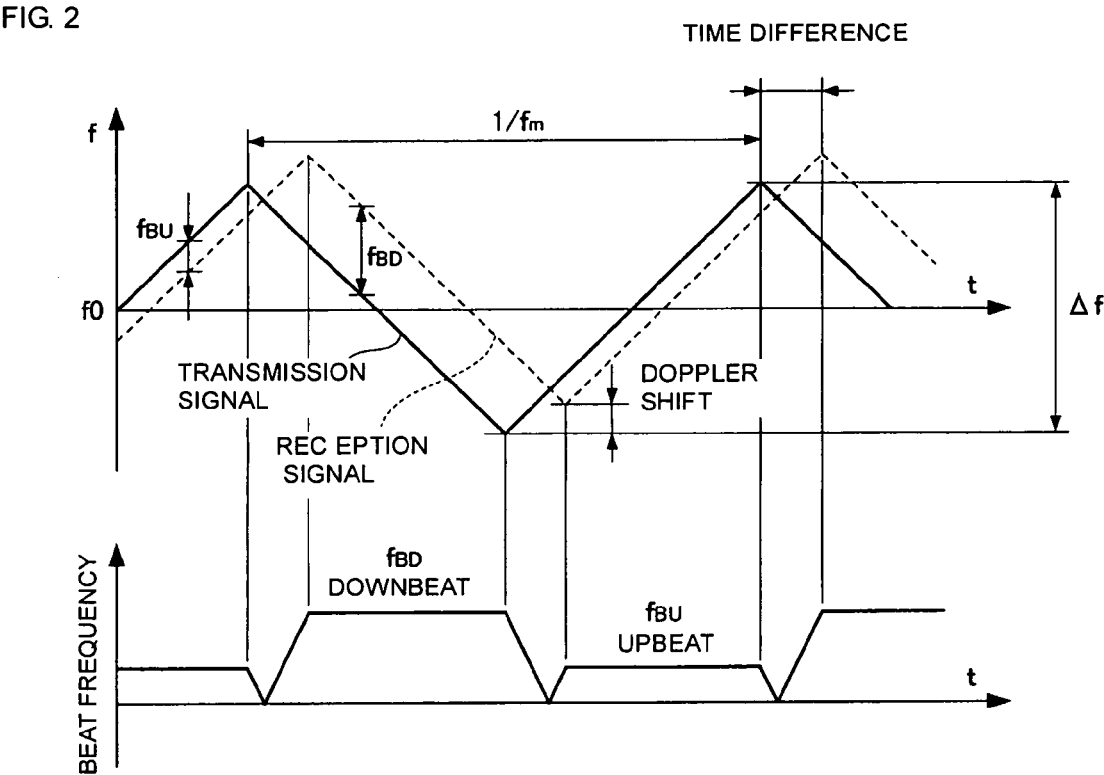
FIG. 2 shows an example of shifts between the frequency of a transmission signal and that of a reception signal, caused by the distance to a target from the radar system and the relative speed of the target with respect to the radar system.

FIG. 2 shows an example of shifts between the frequency of the transmission signal and that of the reception signal, caused by the distance to the target and the relative speed of the target. The difference in the frequency between the transmission signal and the reception signal during the frequency-rising modulation period of the transmission signal is called an up-beat frequency fBU, and the difference in the frequency between the transmission signal and the reception signal during the frequency-falling modulation period of the transmission signal is called a down-beat frequency fBD. A shift (time difference) on the temporal axis between the triangular wave of the transmission signal and that of the reception signal corresponds to a round-trip time of the radio wave from the antenna to the target. A shift on the frequency axis between the triangular wave of the transmission signal and that of the reception signal corresponds to an amount of Doppler shift, which is caused by the relative speed of the target with respect to the antenna. The values of the up-beat frequency fBU and the down-beat frequency fBD vary depending on the time difference and the amount of Doppler shift. Conversely, the up-beat frequency fBU and the down-beat frequency fBD are determined to calculate a distance from the radar system to the target and a relative speed of the target with respect to the radar system.

Figure 3:
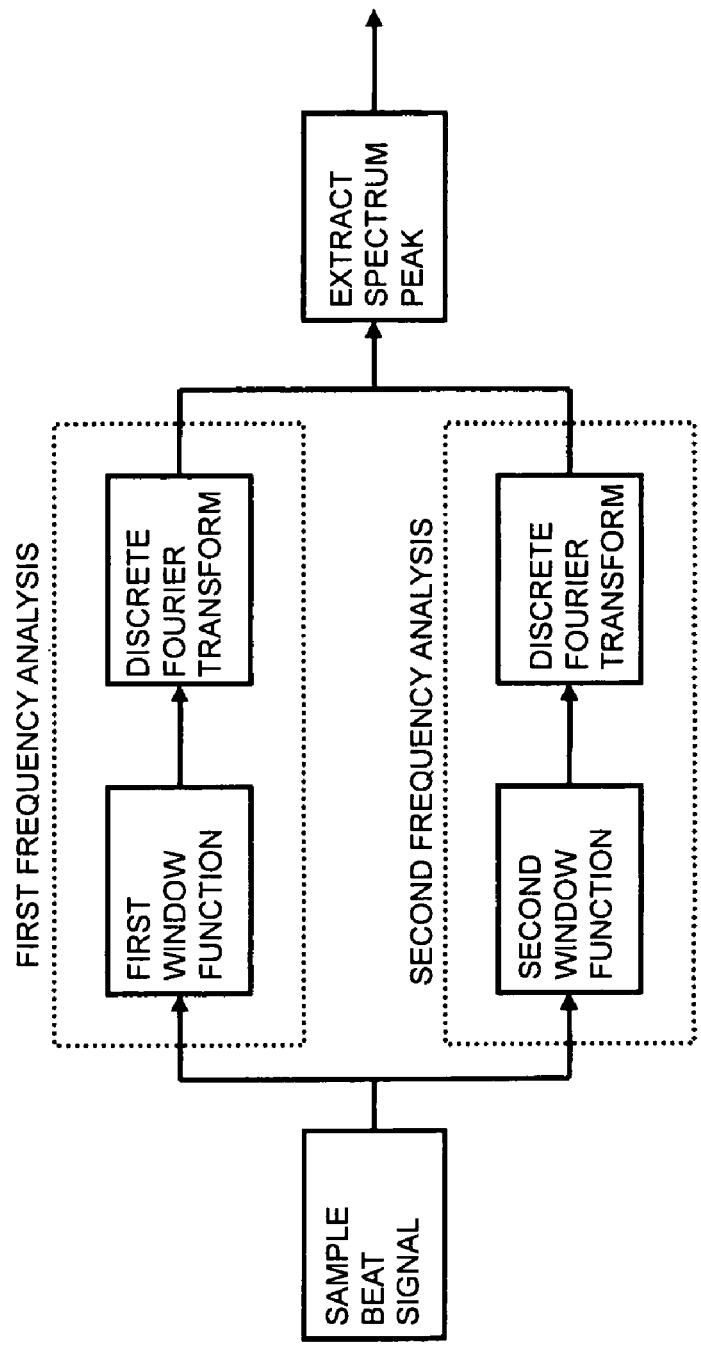
FIG. 3 is a diagram showing a flow of signal and data processing.

FIG. 3 is a block diagram showing a signal processing system in the DSP 13 shown in FIG. 1. According to the first embodiment, beat signals are sampled, a first window function is applied to the sampled data sequence, and discrete Fourier transform is performed in a first frequency analysis. Similarly, a second window function is applied to the sampled data sequence and the discrete Fourier transform is performed in a second frequency analysis. Finally, a spectrum peak is extracted from the first and second frequency spectra.

The window function is applied to the sampled signals when the discrete frequency spectrum of the beat signal is to be yielded by the FFT or the like to suppress an influence of the discontinuity of the signal.

Figure 4:
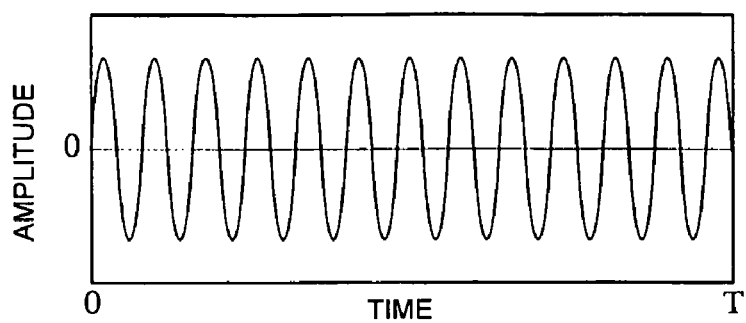
FIG. 4 includes graphs showing the relationship between the frequency spectrum of a window function and the spread of the base of a peak.
Figure 4:
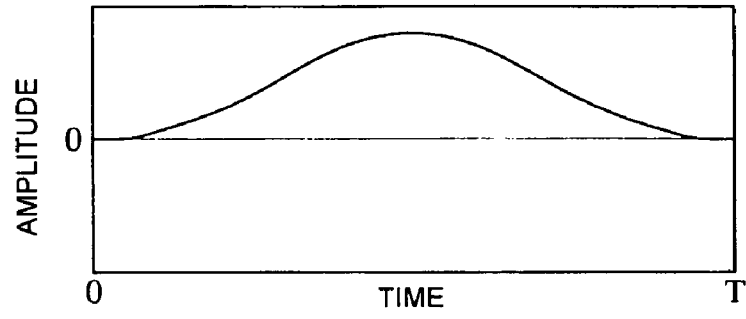
Figure 4:
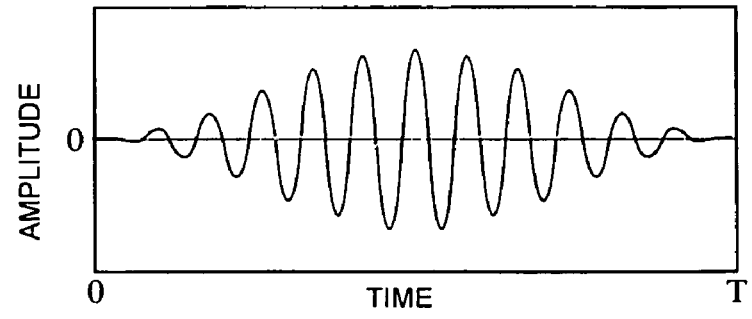
Figure 4:
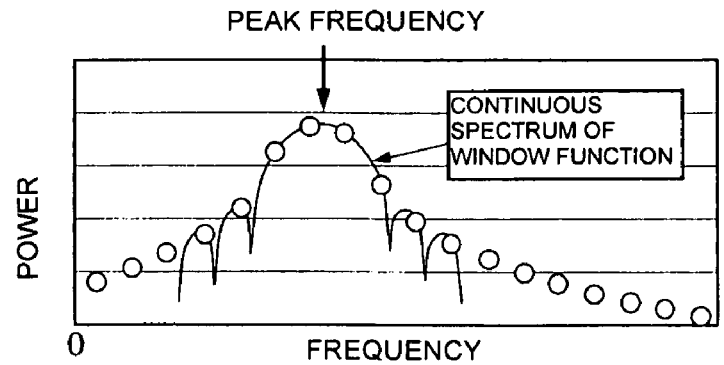

FIG. 4 includes graphs showing examples of the signal processing to which the window function is applied and the frequency spectra resulting from the signal processing. FIG. 4(A) shows the time waveform of a beat signal. A predetermined window function shown in FIG. 4(B) is applied to the data sequence of the beat signal to yield data sequence including a predetermined number of pieces of data (for example, 1,024 pieces of data), as the one shown in FIG. 4(C). The FFT is performed to the data sequence to which the window function is applied to yield a discrete frequency spectrum, as the one shown in FIG. 4(D).

Referring to FIG. 4(D), white circles represent signal strengths (powers) at the discrete frequencies. A solid line represents a continuous spectrum of the window function shown in FIG. 4(B). Since the frequency spectrum of the beat signal to which the window function is applied results from convolution of the beat signal and the window function, the frequency spectrum is spread in the direction of the frequency axis in accordance with the spectrum of the window function to form a wide base of the peak.

Figure 5:
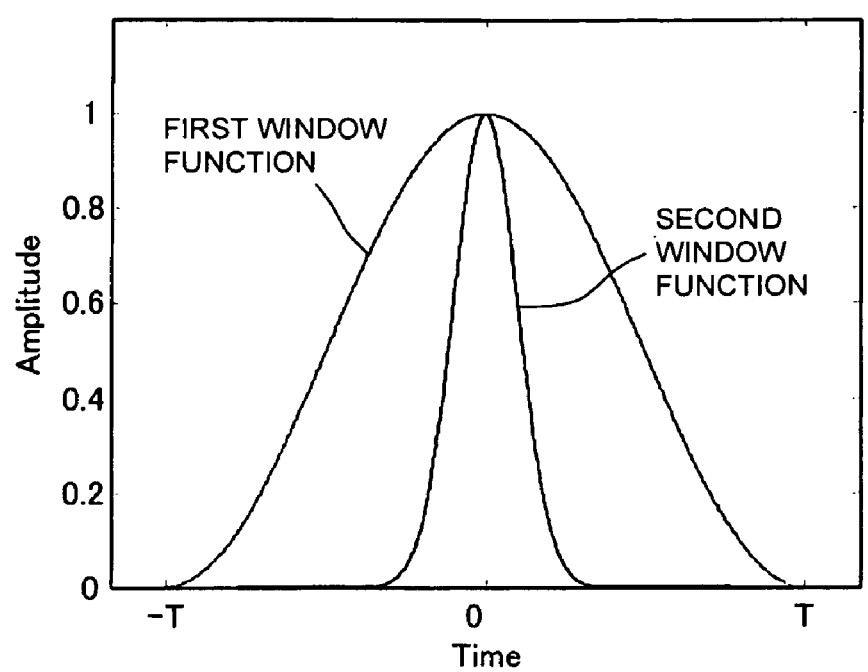
FIG. 5 is a diagram showing examples of the shapes of first and second window functions.

FIG. 5 shows the shapes of the two window functions used in the first embodiment. The first window function has the shape of a Hamming window or a Hanning window having an amplitude that is gently attenuated from the center of the sampling period toward both sides. The second window function has the shape of a Blackman-Harris window or a Kaiser window ($\beta$=20 to 100) having an amplitude that is sharply attenuated.

Figure 6:
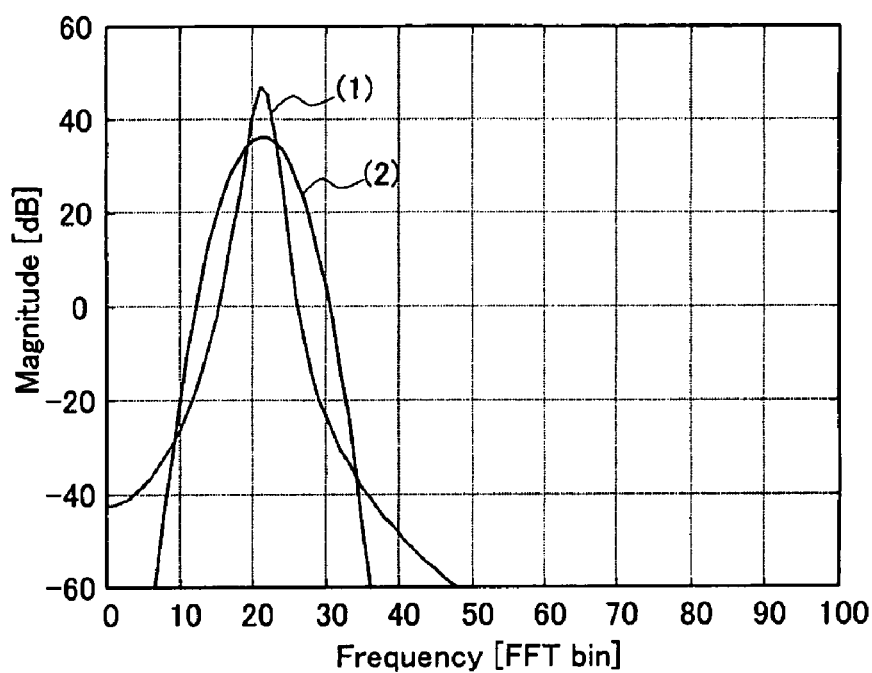
FIG. 6 includes graphs showing the shapes of peaks appearing in the frequency spectrum when the first or second window function is selectively applied depending on whether the target is close to the radar system or is away from the radar system.
Figure 6:
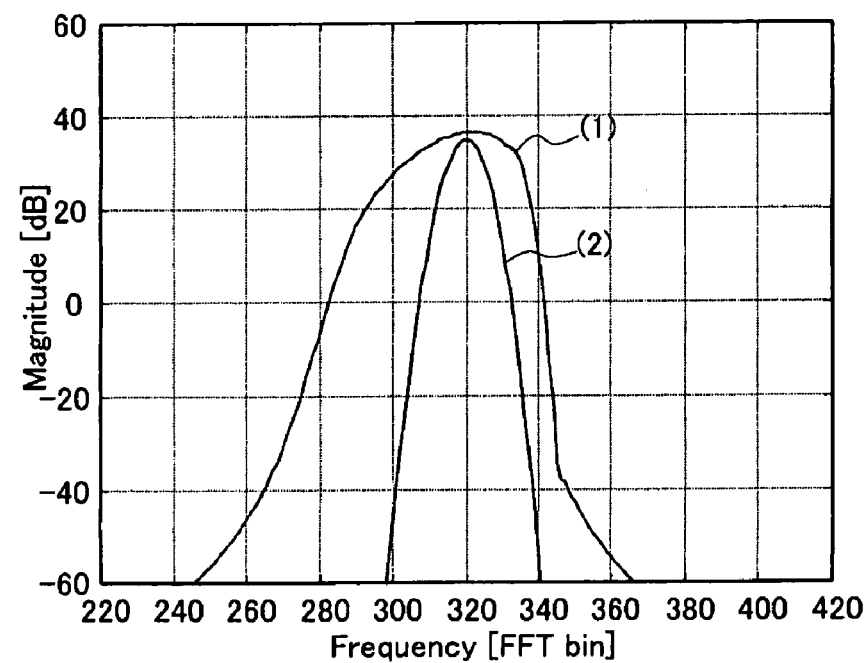

Frequency analysis of the beat signal with modulation distortion by the use of the two window functions having amplitudes that are differently attenuated from the center of the sampling period toward both sides results in frequency spectra shown in FIG. 6. FIG. 6(A) shows frequency spectra when the target is close to the radar system. FIG. 6(B) shows frequency spectra when the target is away from the radar system. The horizontal axis represents frequency (FFT bin) and the vertical axis represents the signal strength. In the graphs shown in FIGS. 6(A) and 6(B), (1) shows the shape of the peak appearing in the frequency spectrum when the first window function is applied and (2) shows the shape of the peak appearing in the frequency spectrum when the second window function is applied.

When the target is close to the radar system, the first window function having an amplitude that is gently attenuated from the center of the sampling period toward both sides provides a peak having a narrower bandwidth is used. In contrast, when the target is away from the radar system, the second window function having an amplitude that is sharply attenuated from the center of the sampling period toward both sides is used to provide a peak having a narrower bandwidth.

The bandwidth becomes wide when the target is away from the radar system because the amount of variation of the beat signal during the frequency-rising modulation period and the frequency-falling modulation period, involved in the modulation distortion, is increased.

Figure 7:
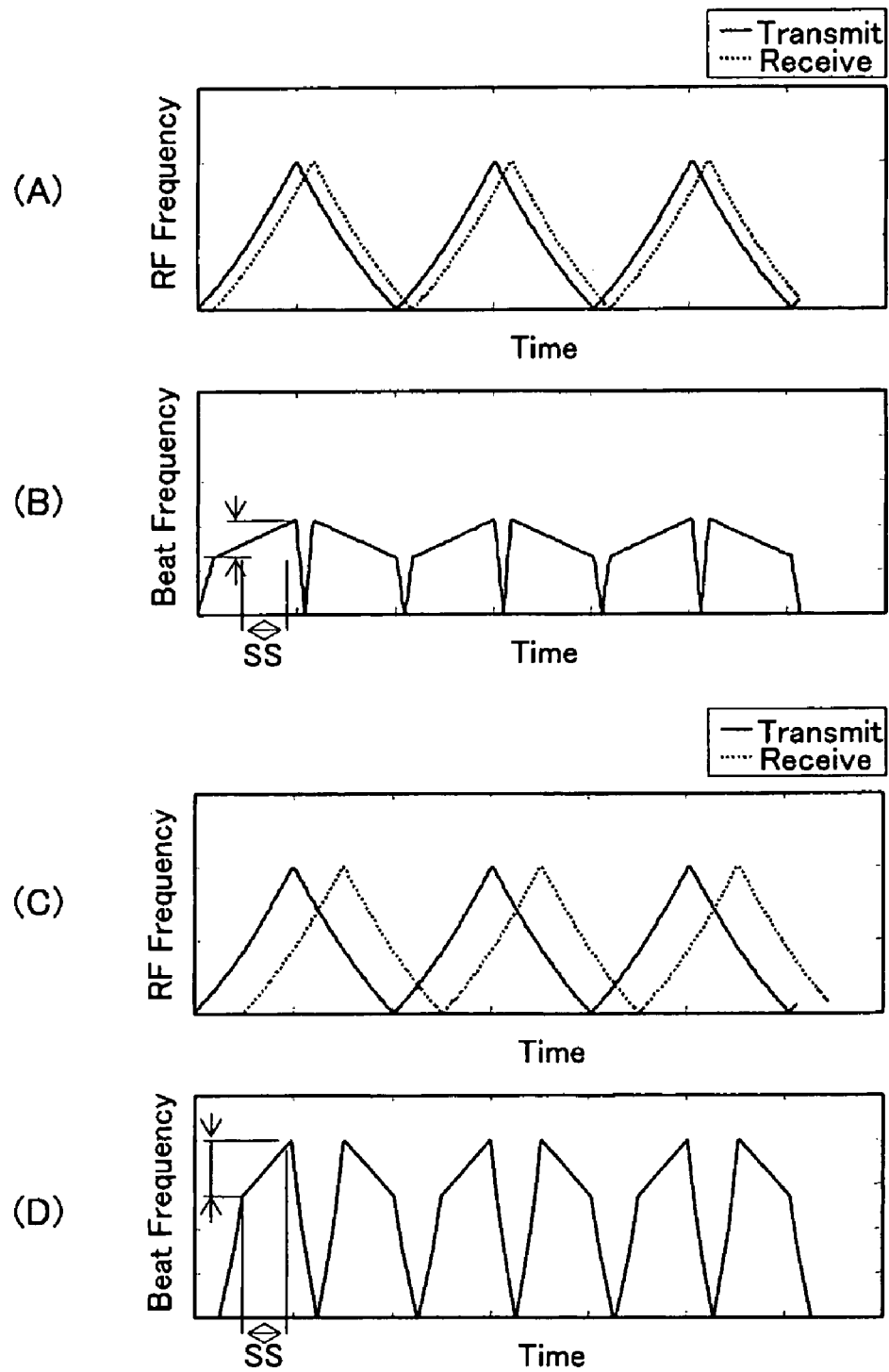
FIG. 7 includes graphs showing examples of the frequency variations during the sampling period depending on the distance to the target when modulation distortion occurs.

The increased amount of variation in the above case will be described with reference to FIG. 7. FIG. 7(A) shows the frequency variation of the transmission signal and the reception signal when the triangular modulation wave is distorted and the target is close to the radar system. FIG. 7(B) shows the frequency variation of the beat signal in the example in FIG. 7(A) during the frequency-rising modulation periods and the frequency-falling modulation periods. FIG. 7(C) shows the frequency variation of the transmission signal and the reception signal when the target is away from the radar system. FIG. 7(D) shows the frequency variation of the beat signal in the example in FIG. 7(C) during the frequency-rising modulation periods and the frequency-falling modulation periods. Referring to FIGS. 7(A) to 7(D), SS denotes a sampling period.

When the frequency of the beat signal is greatly varied during the sampling period SS, the application of the second window function having an amplitude that is sharply attenuated from the center of the sampling period SS toward both sides places more significance on the data in the center of the sampling period and places less significance on the data near both ends of the sampling period. Accordingly, the effect of the frequency variation of the beat signal during the sampling period SS is weakened to suppress the spread of the bandwidth of the peak appearing in the frequency spectrum.

Figure 8:
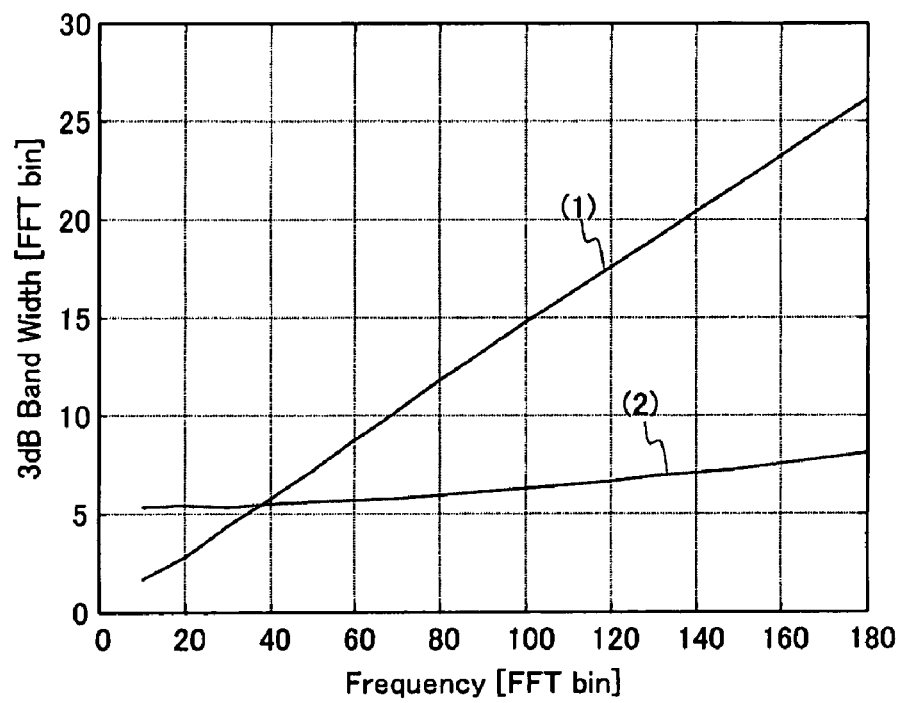
FIG. 8 is a graph showing the relationship between the bandwidth and the frequency of each peak appearing in the frequency spectra when the first and second window functions are applied.

FIG. 8 is a graph showing the respective bandwidths of peaks at frequencies in the frequency spectra when the first and second window functions are applied. The horizontal axis represents the frequency (FFT bin) and the vertical axis represents 3 dB bandwidth (FFT bin). When the first window function is applied, the bandwidth of the peak is spread in proportion to the frequency, that is, in proportion to the distance of the target from the radar system. In contrast, when the second window function is applied, the spread of the bandwidth is kept almost constant regardless of the frequency.

In the example shown in FIG. 8, the use of the first window function narrows down the bandwidth at frequencies lower than about 39 FFT bin and the use of the second window function narrows down the bandwidth at frequencies higher than about 39 FFT bin.

Accordingly, when the above two window functions are used, the frequency spectrum yielded by applying the first window function is adopted in the frequency band lower than 39 FFT bin while the frequency spectrum yielded by applying the second window function is adopted in the frequency band higher than 39 FFT bin.

Figure 9:
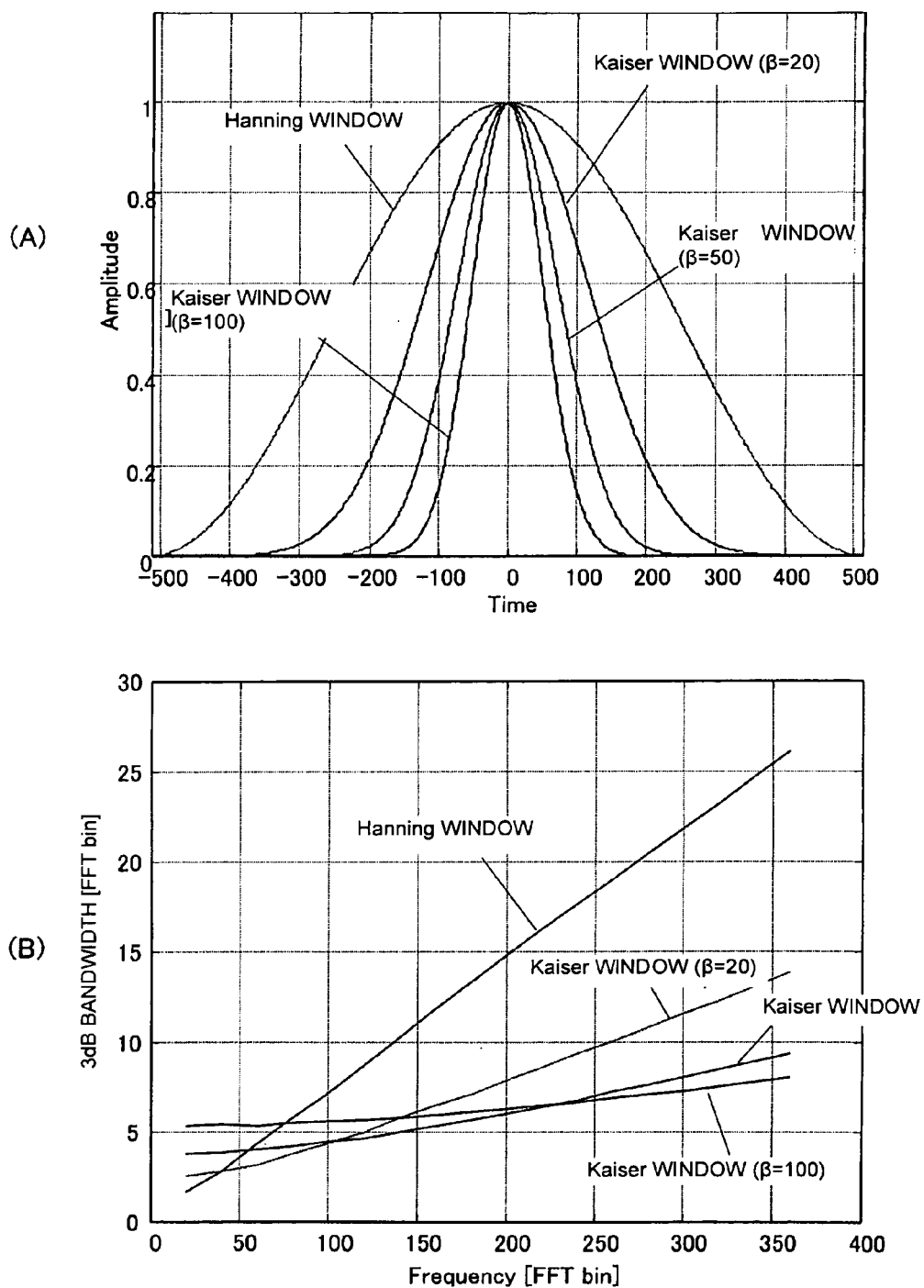
FIG. 9 includes graphs showing examples of variations of the bandwidths in multiple types of window functions.

How the bandwidth increases with the increasing frequency depends on the used window function. For example, as shown in FIG. 9, when a Kaiser window with $\beta$ having a value of 20 or more is used, a variation in the bandwidth with the increasing frequency becomes smaller, compared with a case where a Hanning window is used. A variation in the bandwidth with the increasing frequency becomes smaller as the value of $\beta$ of the Kaiser window rises.

Figure 10:
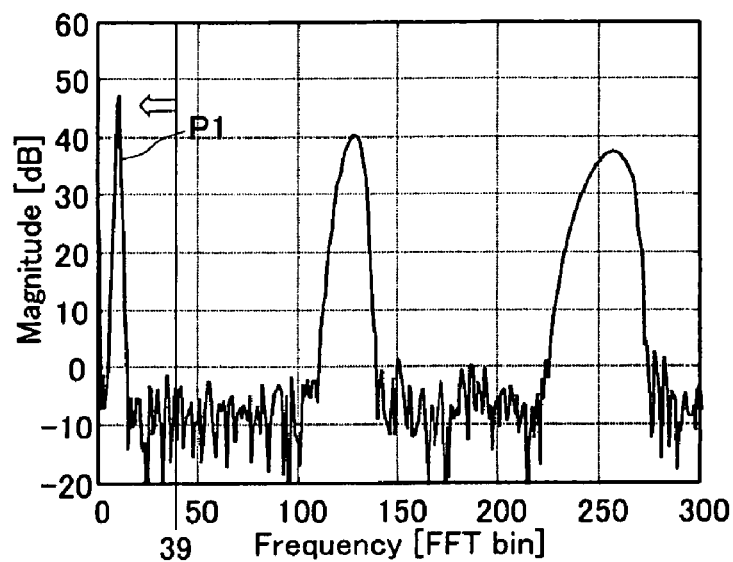
FIG. 10 includes graphs showing results of frequency analyses to which the first and second window functions are applied.
Figure 10:
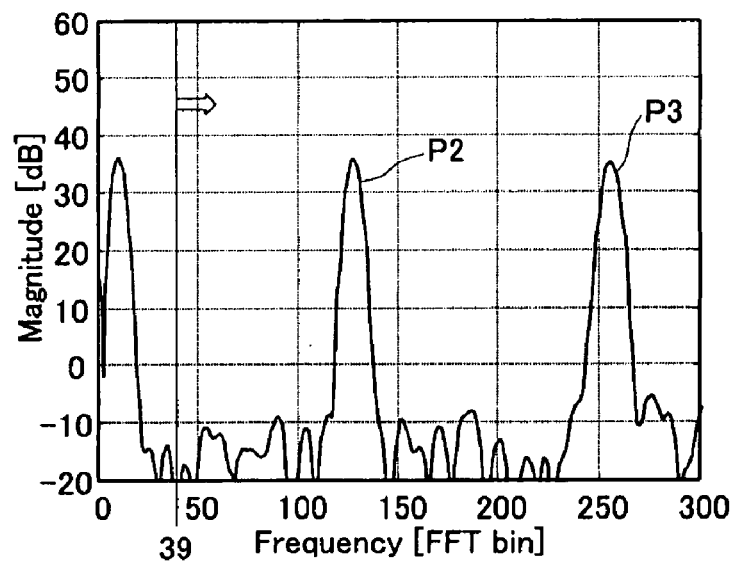

FIG. 10 includes graphs showing examples of the frequency spectra yielded by performing the first and second frequency analyses, described above with reference to FIG. 3, to the beat signal including the reflection signals from three targets having different distances from the radar system. FIG. 10(A) shows a result of the discrete Fourier transform when the first window function is applied and FIG. 10(B) shows a result of the discrete Fourier transform when the second window function is applied. As described above with reference to FIG. 8, the bandwidth of the peak is narrowed with the decreasing distance to the target when the first window function is applied, while the bandwidth of the peak is kept almost constant regardless of the distance when the second window function is applied. Data on a frequency spectrum shown in FIG. 10(A) is adopted in the frequency band lower than 39 FFT bin while data on a frequency spectrum shown in FIG. 10(B) is adopted in the frequency band higher than 39 FFT bin.

In the examples shown in FIGS. 10(A) and 10(B), since a peak P1 appearing at close range has a narrower bandwidth and is sharp, it is possible to measure the distance and speed with higher accuracy. Since peaks P2 and P3 appearing at intermediate range and far range, respectively, have relatively narrow bandwidths, it is also possible to perform accurate measurement. In addition, the application of the second window function which has an amplitude that is sharply attenuated from the center of the sampling period toward both sides and through which a signal having a smaller power passes sharpens the spectrum peak and keeps the level of the sidelobe appearing at both sides of the peak low. As a result, the peak can be detected at a higher SN ratio and even a weak reflection signal at far range can be easily detected.

Figure 11:
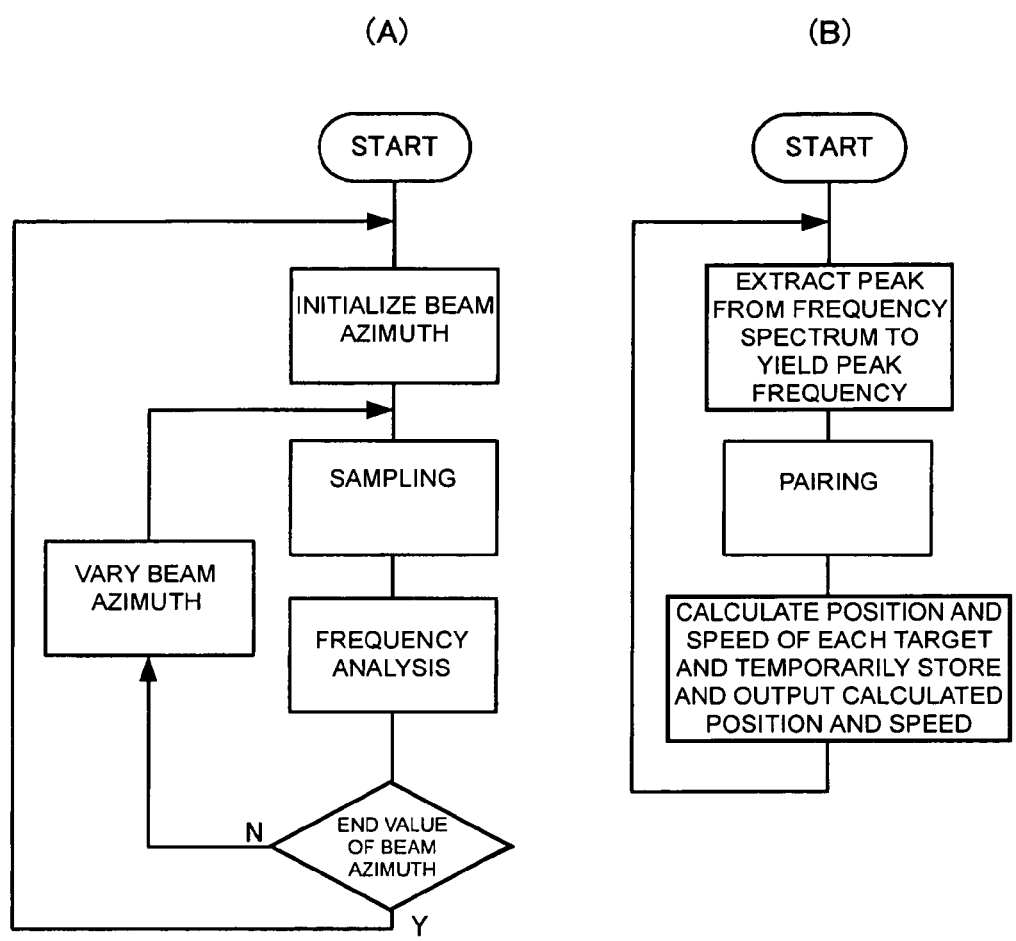
FIG. 11 includes flowcharts showing processes for detection of the target.

Processes for detection of a target will now be described with reference to FIG. 11.

FIG. 11(A) shows a process of performing beam scanning and frequency analysis. First, the azimuth of a beam is initialized, beat signals are sampled, and a predetermined window function is applied to the sampled data sequence to yield a discrete frequency spectrum by the FFT. The sampling and the frequency analysis are repeated while the azimuth of the beam is varied until the azimuth of the beam reaches the end value.

FIG. 11(B) shows a process of detecting a target on the basis of the frequency spectrum. First, any peak is extracted from the frequency spectrum yielded in the above manner to yield the peak frequency. The peak during the frequency-rising modulation period is combined (paired) with the peak during the frequency-falling modulation period, which peaks are caused by the same target. A distance to the target and a relative speed of the target are calculated on the basis of the peak frequencies during the frequency-rising modulation period and the frequency-falling modulation period. The azimuth indicates the azimuth of the beam when the data is sampled.

Finally, information concerning the position and speed of the target, calculated in the above manner, is output outside (to a host system) and is temporarily stored to be used as reference information for the subsequent pairing.

Figure 12:
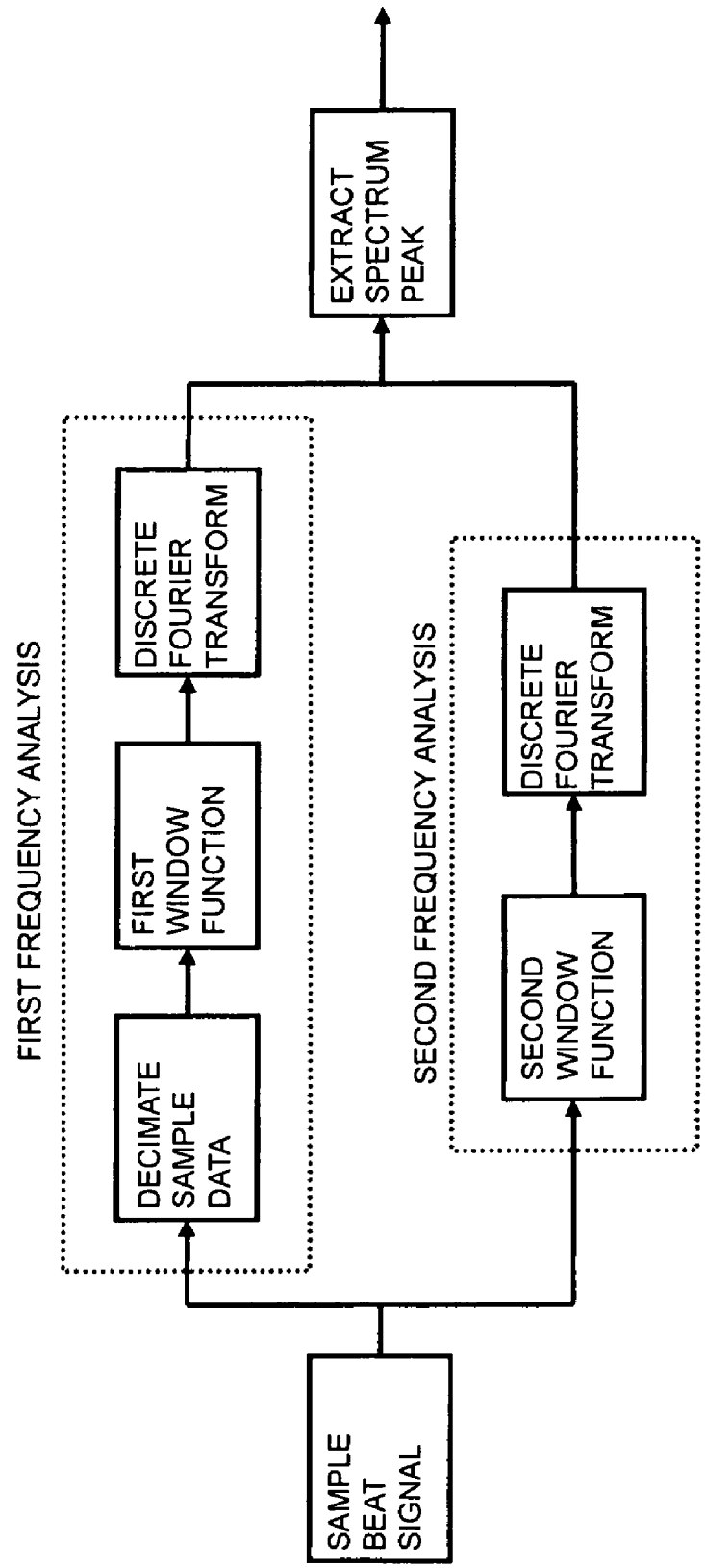
FIG. 12 is a diagram showing a flow of the signal and data processing in a radar system according to a second embodiment.

The structure of a radar system according to a second embodiment will now be described with reference to FIG. 12.

According to the first embodiment, as shown in FIG. 3, beat signals are sampled during the sampling period to yield a predetermined number of pieces of data and the first and second frequency analyses are performed to the sampled data. In contrast, in the example shown in FIG. 12, the sampled data is decimated and the first frequency analysis is performed to the decimated data. Specifically, the first frequency analysis uses the pieces of sampled data of a number that is smaller than that of the pieces of sampled data used in the second frequency analysis.

As shown in FIGS. 10(A) and 10(B), since the frequency spectrum yielded when the first window function is applied uses a near range (lower frequency range), it is enough to sample a smaller number of pieces of sampled data. Accordingly, performing the frequency analysis to the decimated data allows the required processing power to be reduced, thus achieving a high-speed detection by the use of a DSP having a limited processing power.

Figure 13:
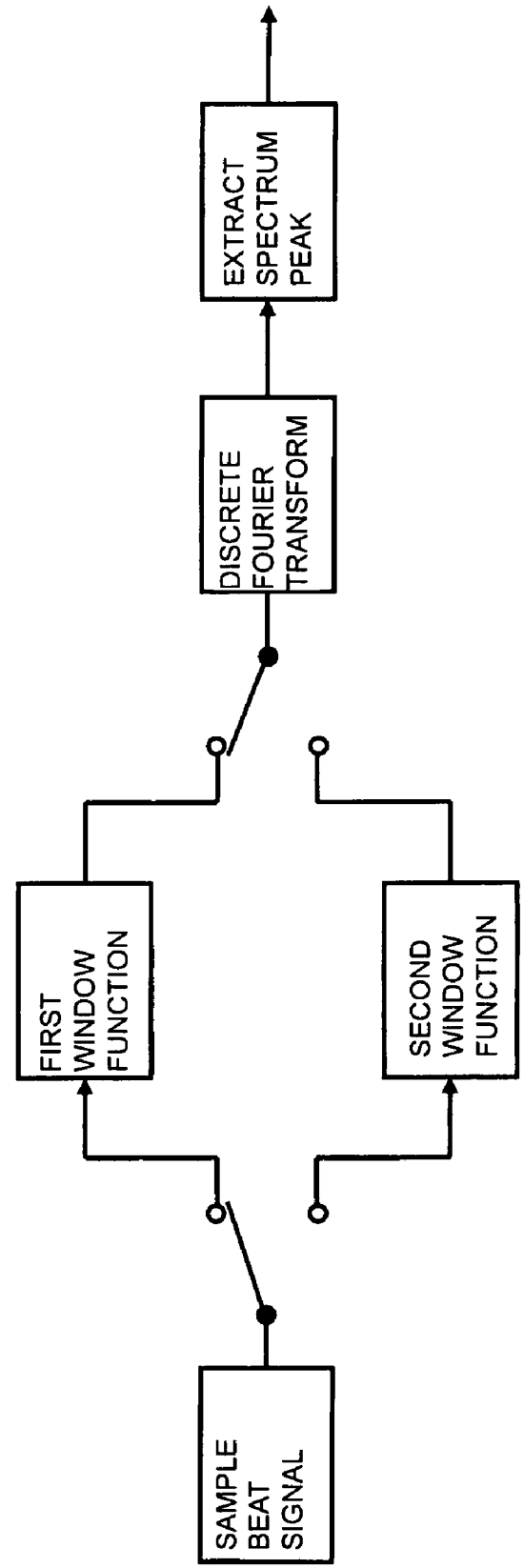
FIG. 13 is a diagram showing a flow of the signal and data processing in a radar system according to a third embodiment.

A radar system according to a third embodiment will now be described with reference to FIG. 13.

Although the first and second frequency analyses are simultaneously performed in the first and second embodiments, the first and second frequency analyses may be performed in a time-shared manner. For example, as shown in FIG. 13, the application of the first window function to the data about the sampled beat signals to perform the discrete Fourier transform may be performed at a timing different from a timing when the second window function is applied to the data about the sampled beat signals to perform the discrete Fourier transform. In addition, the first or second window functions may be selectively applied depending on a required frequency band as long as the first window function is applied to a lower frequency range (near range) in the frequency spectrum and the second window function is applied to a higher frequency range (far range) therein.

In other words, the current location of each target can be sufficiently predicted by performing the beam scanning at the azimuth of the beam and detecting the target each time the azimuth of the beam is varied in the manner shown in FIG. 11(A). Accordingly, a window function to be applied may be selected on the basis of the distances to the target yielded by the last detection or a detection previous to the last detection. For example, when it is predicted that the distance to the target is shorter than a predetermined value, that is, when a peak appears in a frequency range lower than a predetermined frequency in the frequency spectrum, the first window function having an amplitude that is gently attenuated from the center of the sampling period toward both sides should be applied. In contrast, when it is predicted that the distance to the target is longer than the predetermined value, that is, when a peak appears in a frequency range higher than the predetermined frequency in the frequency spectrum, the second window function having an amplitude that is sharply attenuated from the center of the sampling period toward both sides should be applied.

Figure 14:
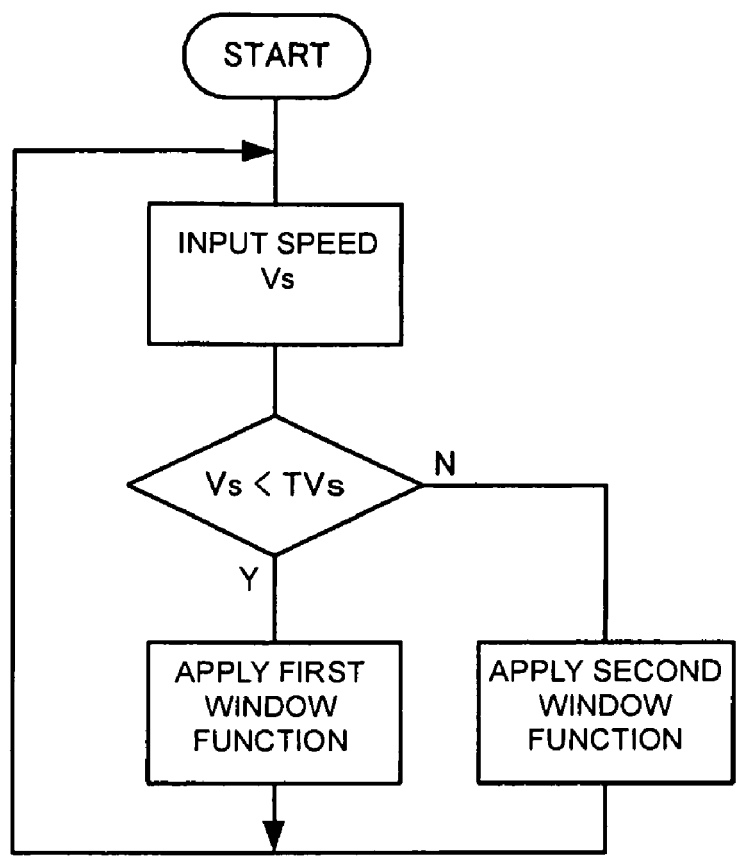
FIG. 14 is a diagram showing an example of application of the window function in a radar system according to a fourth embodiment.

A process of setting a window function in a radar system according to a fourth embodiment will now be described with reference to FIG. 14.

The fourth embodiment is applied to an in-vehicle radar system in which the window functions are switched in accordance with the driving speed of the vehicle. First, data about the speed VS of the vehicle is input. The data is yielded with the speedometer provided in the vehicle. If the speed VS of the vehicle is lower than a predetermined threshold value TVs, the first window function having an amplitude that is gently attenuated from the center of the sampling period toward both sides is applied. If the speed VS of the vehicle is higher than the predetermined threshold value TVs, the second window function having an amplitude that is sharply attenuated from the center of the sampling period toward both sides is applied.

The application of the first window function when the vehicle is driven at a lower speed improves the accuracy of the detection (the resolution of the distance and speed) at lower frequencies in the frequency spectrum, that is, at close range. In contrast, the application of the second window function when the vehicle is driven at a higher speed improves the accuracy of the detection at higher frequencies in the frequency spectrum, that is, at far range. In the manner described above, it is possible to focus the beam on a predetermined distance range set in accordance with the actual driving environment to detect the target in the predetermined distance range.

Figure 15:
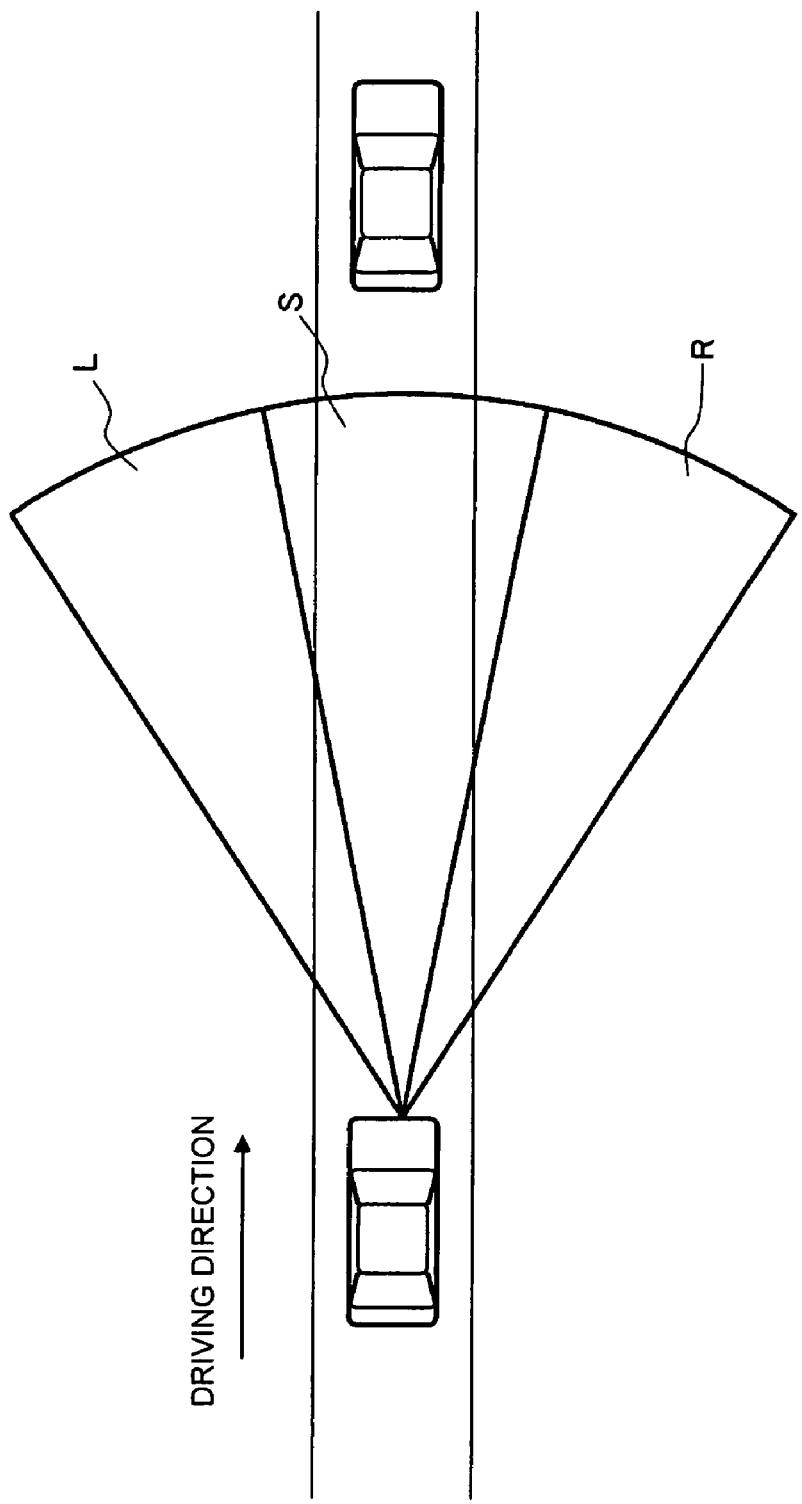
FIG. 15 is a diagram showing an example of application of the window function in a radar system according to a fifth embodiment.
Figure 16:
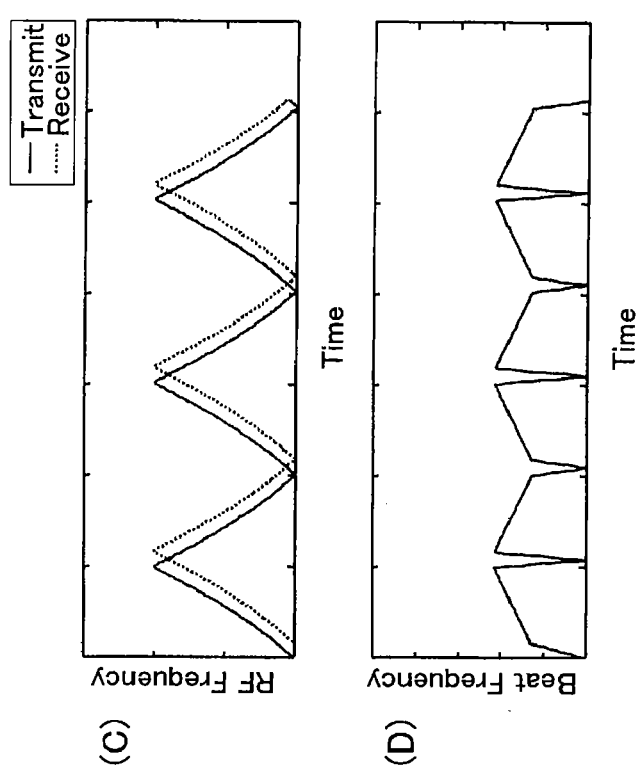
FIG. 16 includes graphs showing examples of the frequency variations of beat signals with or without the modulation distortion.
Figure 16:
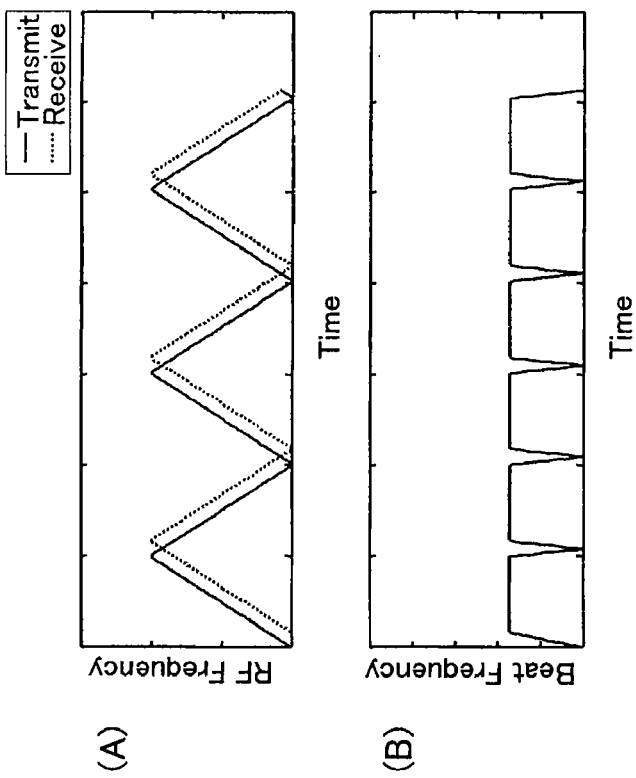
Figure 17:
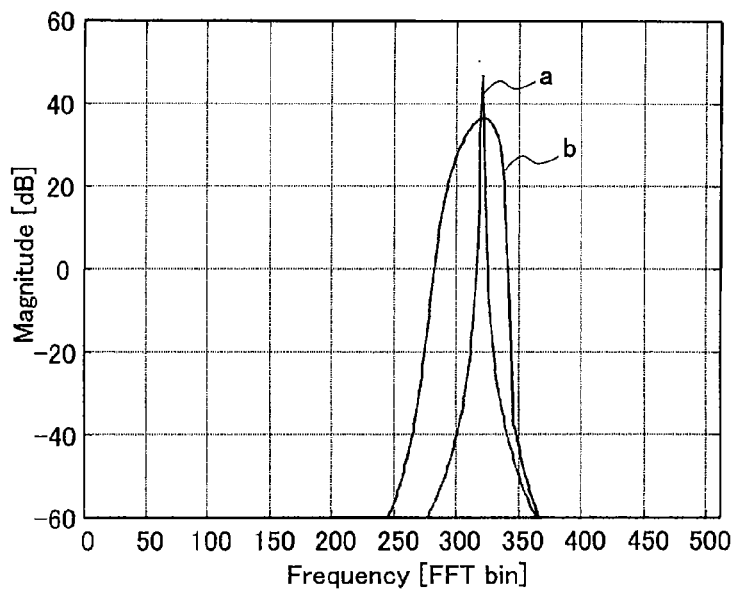
FIG. 17 is a graph showing how the modulation distortion affects on peaks appearing in the frequency spectrum.
Figure 18:
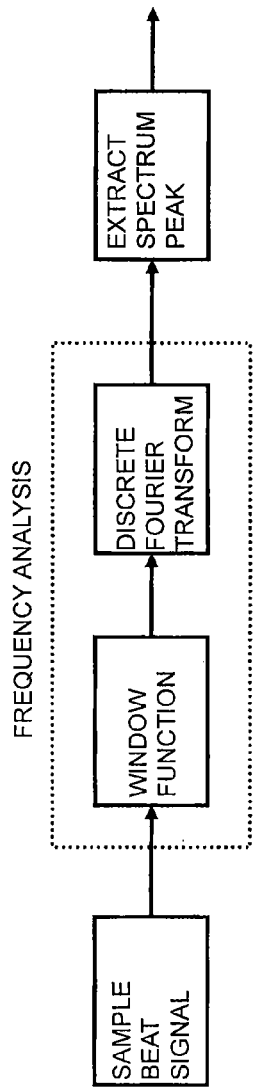
FIG. 18 is a diagram showing a flow of the signal and data processing in a known radar system.

Application of a window function in a radar system according to a fifth embodiment will now be described with reference to FIG. 15.

In the fifth embodiment, a scanning beam is directed at a horizontal angle in the front of the vehicle, and different window functions are selectively applied depending on whether the azimuth of the beam is within a narrow azimuthal range S with respect to the front of the vehicle or within azimuthal range L or R on the left or right side of the azimuthal range S. When the azimuth of the beam is within the azimuthal range S, the second window function having an amplitude that is sharply attenuated from the center of the sampling period toward both sides is applied. In contrast, when the azimuth of the beam is within the azimuthal range L or R, the first window function having an amplitude that is gently attenuated from the center of the sampling period toward both sides is applied.

In the manner described above, the accuracy of the detection of a target (another vehicle) at far range is improved in the front of the vehicle, and the accuracy of the detection of the target at close range is improved in diagonal directions on the left and right sides of the front of the vehicle. As a result, it is possible to reliably detect a vehicle that, for example, changes the lane to cut into the front of the vehicle from a side direction.

The invention claimed is:

1. A radar system comprising:
   a transmitter portion transmitting a transmission signal subjected to frequency modulation and generating a beat signal including a frequency component corresponding to a difference in frequency between the transmission signal and a reflection signal from a target to which the transmission signal is transmitted;
   a frequency analyzer sampling the beat signal and applying a window function to sampled data to yield a discrete frequency spectrum;
   a processor yielding a peak frequency of a peak appearing in the frequency spectrum due to the reflection signal; and
   a target detector detecting the target on the basis of the peak frequency,
   wherein the frequency analyzer selectively applies, as the window function, a plurality of window functions having amplitudes that are differently attenuated from a center of a sampling period toward both sides thereof, and
   wherein a window function having an amplitude that is gently attenuated from the center of the sampling period toward both sides thereof is applied to a first frequency band in the frequency spectrum to yield the frequency spectrum, and a window function having an amplitude that is sharply attenuated from the center of the sampling period toward both sides thereof is applied to a second frequency band in the frequency spectrum to yield the frequency spectrum, the second frequency band being higher than the first frequency band.

2. A radar system comprising:

a transmitter transmitting a transmission signal subjected to frequency modulation and generating a beat signal including a frequency component corresponding to a difference in frequency between the transmission signal and a reflection signal from a target to which the transmission signal is transmitted;

a frequency analyzer sampling the beat signal and applying a window function to sampled data to yield a discrete frequency spectrum;

a processor yielding a peak frequency of a peak appearing in the frequency spectrum due to the reflection signal; and a target detector detecting the target on the basis of the peak frequency, wherein the frequency analyzer selectively applies, as the window function, a plurality of window functions having amplitudes that are differently attenuated from a center of a sampling period toward both sides thereof, and wherein a window function having an amplitude that is gently attenuated from the center of the sampling period toward both sides thereof is applied when it is predicted that the peak appears in a first frequency band in the frequency spectrum, and a window function having an amplitude that is sharply attenuated from the center of the sampling period toward both sides thereof is applied when it is predicted that the peak appears in a second frequency band in the frequency spectrum, the second frequency band being higher than the first frequency band.

3. The radar system according to claim 2, wherein the detection of the target by the target detector is repeated, and the window functions having amplitudes that are differently attenuated from the center of the sampling period toward both sides thereof are selectively applied depending on a distance to the target, calculated in a last detection or a detection previous to the last detection.

4. An in-vehicle radar system mounted in a vehicle, the radar system comprising:

a transmitter transmitting a transmission signal subjected to frequency modulation and generating a beat signal including a frequency component corresponding to a difference in frequency between the transmission signal and a reflection signal from a target to which the transmission signal is transmitted;

a frequency analyzer sampling the beat signal and applying a window function to sampled data to yield a discrete frequency spectrum;

a processor yielding a peak frequency of a peak appearing in the frequency spectrum due to the reflection signal; and a target detector detecting the target on the basis of the peak frequency, wherein the frequency analyzer selectively applies, as the window function, a plurality of window functions having amplitudes that are differently attenuated from a center of a sampling period toward both sides thereof, and wherein a window function having an amplitude that is gently attenuated from the center of the sampling period toward both sides thereof is applied while the vehicle is moving at a first speed, and a window function having an amplitude that is sharply attenuated from the center of the sampling period toward both sides thereof is applied while the vehicle is moving at a second speed higher than the first speed.

5. An in-vehicle radar system mounted in a vehicle, the radar system comprising:

a transmitter transmitting a transmission signal subjected to frequency modulation and generating a beat signal including a frequency component corresponding to a difference in frequency between the transmission signal and a reflection signal from a target to which the transmission signal is transmitted;

a frequency analyzer sampling the beat signal and applying a window function to sampled data to yield a discrete frequency spectrum;

a processor yielding a peak frequency of a peak appearing in the frequency spectrum due to the reflection signal; and a target detector detecting the target on the basis of the peak frequency, wherein the frequency analyzer selectively applies, as the window function, a plurality of window functions having amplitudes that are differently attenuated from a center of a sampling period toward both sides thereof, and wherein the radar system directs a scanning beam at a horizontal angle in front of a vehicle, and a window function having an amplitude that is sharply attenuated from the center of the sampling period toward both sides thereof is applied when the horizontal angle of the scanning beam is in a range having a first scanning angle with respect to the front of the vehicle, and a window function having an amplitude that is gently attenuated from the center of the sampling period toward both sides thereof is applied when the horizontal angle of the scanning beam is in a range outside of the first scanning angle with respect to the front of the vehicle.

* * * * *